(12) United States Patent
Stein et al.

(10) Patent No.: US 10,375,632 B1
(45) Date of Patent: Aug. 6, 2019

(54) POWER MANAGEMENT FOR ELECTROMAGNETIC POSITION TRACKING SYSTEMS

(71) Applicant: Google LLC, Mountain View, CA (US)

(72) Inventors: Murphy Stein, San Jose, CA (US); Ian Atkinson, Castro Valley, CA (US); Advait Jain, Santa Clara, CA (US); Lucine Oganesian, Mountain View, CA (US); Sherk Chung, Piedmont, CA (US); Saket Patkar, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/889,861

(22) Filed: Feb. 6, 2018

(51) Int. Cl.
| | | |
|---|---|---|
| *H04B 5/02* | (2006.01) | |
| *H04W 52/02* | (2009.01) | |
| *H04B 5/00* | (2006.01) | |

(52) U.S. Cl.
CPC ...... *H04W 52/0209* (2013.01); *H04B 5/0031* (2013.01); *H04B 5/0043* (2013.01)

(58) Field of Classification Search
CPC ........... H04W 52/0209; H04W 5/0031; H04W 5/0043
USPC ................................ 455/41.1, 41.2
See application file for complete search history.

(56) References Cited

U.S. PATENT DOCUMENTS

| | | | | |
|---|---|---|---|---|
| 4,647,990 A | * | 3/1987 | Sasamura | G11B 15/4676 360/70 |
| 4,999,637 A | * | 3/1991 | Bass | H04B 7/145 342/367 |
| 6,774,624 B2 | * | 8/2004 | Anderson | A61B 5/06 324/207.17 |
| 6,965,816 B2 | * | 11/2005 | Walker | B64C 13/20 244/189 |
| 6,973,622 B1 | * | 12/2005 | Rappaport | H04L 41/145 703/21 |

(Continued)

FOREIGN PATENT DOCUMENTS

| | | |
|---|---|---|
| WO | 2016134299 A1 | 8/2016 |
| WO | 2017014690 A1 | 1/2017 |
| WO | 2017213862 A1 | 12/2017 |

OTHER PUBLICATIONS

Invitation to Pay Additional Fees, Partial International Search Report, and Provisional Opinion dated Apr. 8, 2019 for corresponding International Application No. PCT/US2019/015981, 13 pages.

(Continued)

*Primary Examiner* — Hai V Nguyen

(57) ABSTRACT

An EM pose tracking system controls a power mode by adjusting a transmit power of the EM transmitter based on a metric correlated with jitter in the EM readings. Such a metric includes metrics such as estimated noise computed from received EM data, a computed distance between the transmitter and the receiver, a measured signal power between the transmitter and the receiver, and the like. By adjusting the transmit power based on the jitter metric, the EM tracking system can reduce overall power consumption at a device that employs the EM tracking system, thus allowing the system to be used in a wider variety of devices and improving the user experience with those devices.

34 Claims, 8 Drawing Sheets

(56) References Cited

U.S. PATENT DOCUMENTS

| | | | | |
|---|---|---|---|---|
| 6,980,921 B2* | 12/2005 | Anderson | ............. | A61B 5/06 |
| | | | | 324/207.17 |
| 7,015,859 B2* | 3/2006 | Anderson | ............. | A61B 5/06 |
| | | | | 342/450 |
| 7,096,148 B2* | 8/2006 | Anderson | ............. | A61B 5/06 |
| | | | | 324/207.17 |
| 7,162,250 B2* | 1/2007 | Misra | ............. | H04W 16/08 |
| | | | | 455/445 |
| 7,471,202 B2* | 12/2008 | Anderson | ............. | A61B 90/36 |
| | | | | 340/572.1 |
| 7,508,195 B2* | 3/2009 | Anderson | ............. | G01B 7/003 |
| | | | | 324/207.16 |
| 7,532,997 B2* | 5/2009 | Li | ............. | G01B 7/003 |
| | | | | 324/207.17 |
| 7,626,569 B2* | 12/2009 | Lanier | ............. | G06F 1/1601 |
| | | | | 345/156 |
| 7,640,121 B2* | 12/2009 | Anderson | ............. | G01S 13/84 |
| | | | | 324/207.17 |
| 7,773,204 B1* | 8/2010 | Nelson | ............. | G01S 13/48 |
| | | | | 356/5.02 |
| 8,121,812 B2* | 2/2012 | Higgins | ............. | A61B 5/06 |
| | | | | 324/207.17 |
| 8,190,098 B2* | 5/2012 | Hus | ............. | H04L 1/0015 |
| | | | | 370/312 |
| 8,503,336 B2* | 8/2013 | Rappaport | ............. | H04L 41/145 |
| | | | | 370/252 |
| 8,909,175 B1* | 12/2014 | McCallister | ............. | H04L 27/368 |
| | | | | 330/127 |
| 9,333,875 B2* | 5/2016 | Staunton | ............. | B60L 13/03 |
| 9,498,231 B2* | 11/2016 | Haider | ............. | A61B 17/1703 |
| 9,582,739 B2* | 2/2017 | Padubrin | ............. | G06K 9/48 |
| 9,652,038 B2* | 5/2017 | Osman | ............. | A63F 13/212 |
| 9,762,289 B2* | 9/2017 | Henry | ............. | H04B 5/0018 |
| 9,831,920 B2* | 11/2017 | Perry | ............. | H04B 5/0037 |
| 9,911,020 B1* | 3/2018 | Liu | ............. | G01S 13/00 |
| 9,948,135 B2* | 4/2018 | Leabman | ............. | H02J 7/042 |
| 9,991,934 B2* | 6/2018 | Henry | ............. | H04B 5/0018 |
| 10,068,115 B2* | 9/2018 | Liu | ............. | G01S 13/00 |
| 10,080,617 B2* | 9/2018 | Haider | ............. | A61B 17/1703 |
| 10,134,192 B2* | 11/2018 | Tomlin | ............. | G02B 27/0172 |
| 2003/0093187 A1* | 5/2003 | Walker | ............. | B64C 13/20 |
| | | | | 701/1 |
| 2003/0184285 A1* | 10/2003 | Anderson | ............. | A61B 5/06 |
| | | | | 324/207.17 |
| 2004/0149036 A1* | 8/2004 | Foxlin | ............. | A61B 5/1113 |
| | | | | 73/511 |
| 2004/0229621 A1* | 11/2004 | Misra | ............. | H04W 16/08 |
| | | | | 455/445 |
| 2004/0236547 A1* | 11/2004 | Rappaport | ............. | G06F 17/509 |
| | | | | 703/2 |
| 2005/0052333 A1* | 3/2005 | Rao | ............. | H01Q 19/17 |
| | | | | 343/840 |
| 2005/0187677 A1* | 8/2005 | Walker | ............. | B64C 13/20 |
| | | | | 701/16 |
| 2005/0265321 A1* | 12/2005 | Rappaport | ............. | H04L 41/145 |
| | | | | 370/352 |
| 2006/0143645 A1* | 6/2006 | Vock | ............. | A43B 3/00 |
| | | | | 725/9 |
| 2006/0161789 A1* | 7/2006 | Doughty | ............. | G06Q 20/327 |
| | | | | 713/186 |
| 2007/0047407 A1* | 3/2007 | Chang | ............. | G11B 7/1263 |
| | | | | 369/47.53 |
| 2008/0232291 A1* | 9/2008 | Hus | ............. | H04L 1/0015 |
| | | | | 370/312 |
| 2009/0040099 A1* | 2/2009 | Young | ............. | G01S 7/4026 |
| | | | | 342/179 |
| 2009/0076746 A1* | 3/2009 | Higgins | ............. | A61B 5/06 |
| | | | | 702/57 |
| 2009/0195385 A1* | 8/2009 | Huang | ............. | G08B 21/245 |
| | | | | 340/572.1 |
| 2010/0197390 A1* | 8/2010 | Craig | ............. | G06K 9/00369 |
| | | | | 463/30 |
| 2010/0256481 A1* | 10/2010 | Mareci | ............. | G01R 33/341 |
| | | | | 600/423 |
| 2011/0267269 A1* | 11/2011 | Tardif | ............. | G06F 3/011 |
| | | | | 345/158 |
| 2012/0056677 A1* | 3/2012 | Zhu | ............. | H03F 1/0233 |
| | | | | 330/296 |
| 2013/0006573 A1* | 1/2013 | Brunner | ............. | G01C 17/38 |
| | | | | 702/141 |
| 2014/0012505 A1* | 1/2014 | Smith | ............. | G01V 3/12 |
| | | | | 702/2 |
| 2014/0107471 A1* | 4/2014 | Haider | ............. | A61B 17/1703 |
| | | | | 600/424 |
| 2014/0342844 A1* | 11/2014 | Mooney | ............. | G06K 9/00342 |
| | | | | 473/266 |
| 2014/0358457 A1* | 12/2014 | Swanson | ............. | G01R 21/133 |
| | | | | 702/60 |
| 2015/0003562 A1* | 1/2015 | McCallister | ............. | H04B 1/0475 |
| | | | | 375/297 |
| 2015/0035436 A1* | 2/2015 | Kamdar | ............. | H01J 61/523 |
| | | | | 315/111.21 |
| 2015/0102977 A1* | 4/2015 | Lockyear | ............. | G06K 7/10346 |
| | | | | 343/893 |
| 2016/0022374 A1* | 1/2016 | Haider | ............. | A61B 17/17 |
| | | | | 606/96 |
| 2016/0033768 A1* | 2/2016 | Pedrotti | ............. | G02B 27/0149 |
| | | | | 345/8 |
| 2016/0052451 A1* | 2/2016 | O'Kane | ............. | B60Q 9/008 |
| | | | | 340/435 |
| 2016/0105218 A1* | 4/2016 | Henry | ............. | H04B 5/0018 |
| | | | | 455/523 |
| 2016/0243944 A1* | 8/2016 | Staunton | ............. | B60L 13/03 |
| 2016/0246369 A1* | 8/2016 | Osman | ............. | A63F 13/212 |
| 2016/0259404 A1* | 9/2016 | Woods | ............. | G06F 3/0346 |
| 2017/0085120 A1* | 3/2017 | Leabman | ............. | H02J 7/042 |
| 2017/0087364 A1* | 3/2017 | Cartledge | ............. | A61N 1/36014 |
| 2017/0173262 A1* | 6/2017 | Veltz | ............. | A61M 5/1723 |
| 2017/0205880 A1* | 7/2017 | Osman | ............. | A63F 13/212 |
| 2017/0281280 A1* | 10/2017 | Haider | ............. | A61B 17/1703 |
| 2017/0311264 A1* | 10/2017 | Raghupathy | ............. | H04W 52/0245 |
| 2017/0373720 A1* | 12/2017 | Henry | ............. | H04B 5/0018 |
| 2018/0097546 A1* | 4/2018 | Perry | ............. | H02J 50/90 |
| 2018/0108179 A1* | 4/2018 | Tomlin | ............. | G02B 27/0172 |
| 2018/0165484 A1* | 6/2018 | Liu | ............. | G01S 13/00 |
| 2018/0166784 A1* | 6/2018 | Johnson | ............. | H04W 4/029 |
| 2018/0181207 A1* | 6/2018 | Fullam | ............. | G06F 1/3215 |
| 2018/0254800 A1* | 9/2018 | Henry | ............. | H04B 5/0018 |

OTHER PUBLICATIONS

International Search Report and Written Opinion dated Jun. 6, 2019 for corresponding International Application No. PCT/US2019/015981, 20 pages.

* cited by examiner

POWER MANAGEMENT FOR ELECTROMAGNETIC POSITION TRACKING SYSTEMS

BACKGROUND

Field of the Disclosure

The present disclosure relates generally to electromagnetic (EM) tracking systems and more particularly to power management for EM tracking systems.

Description of the Related Art

Position tracking systems that use near-field electromagnetic fields ("EM tracking systems") are useful in a variety of electronic devices and systems, as the EM tracking systems do not require line-of-sight between the transmitter and receiver. Other tracking systems that rely on alternate signal mediums (such as laser, LED, optical, camera, or ultrasonic mediums) for high precision localized tracking require a direct line-of-sight between the object being tracked and a pose sensor which provides the data for the position. An EM tracking system generally includes a transmitter that generates an EM field on a tri-axis coil to induce a current on a second tri-axis coil at a receiver. The receiver generates a plurality of readings which are then processed to compute a position and orientation of the transmitter relative to the receiver. Typically, the transmitter (Tx) and receiver (Rx) are distributed over different devices, including a "base device" that tracks the position and/or orientation of a "mobile device".

Conventional EM tracking systems typically consume a relatively high amount of power. In particular, because an EM tracking system depends on near-field magnetic coupling, EM signal strength falls off sharply with distance. Accordingly, to minimize jitter in the EM readings and ensure accurate tracking of the mobile device, the Tx typically generates the EM field at a relatively high signal strength, requiring a high amount of power. The high consumption of power limits the utility of EM tracking systems for different applications and devices, such as devices that rely on battery power.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
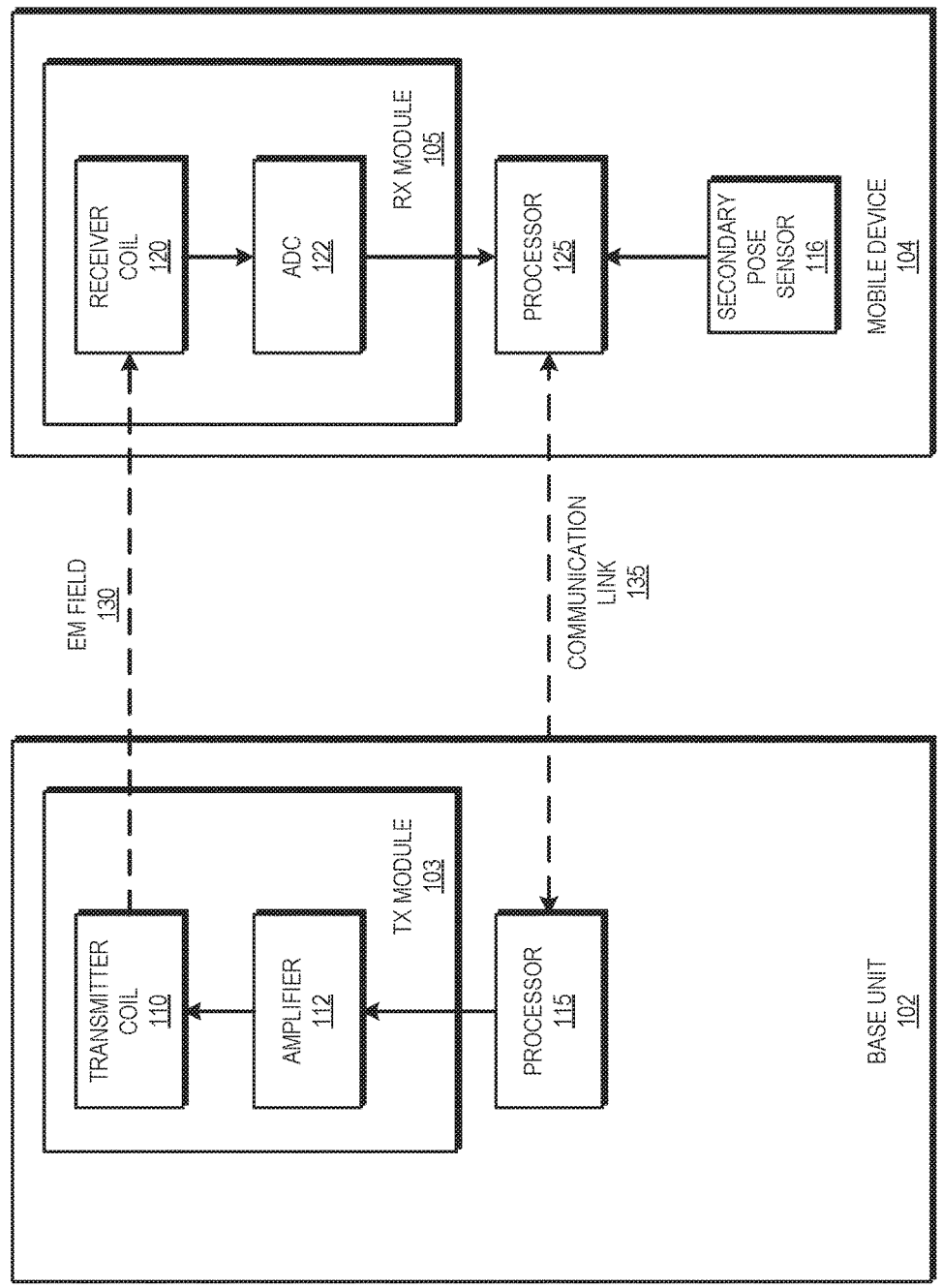
FIG. 1 is a block diagram of an EM tracking system that adjusts a power mode of the system based on one or more of a metric correlated with jitter and a sleep condition in accordance with some embodiments.

FIGS. 1-11 illustrate techniques for controlling a power mode of an EM pose tracking system, where a pose is defined as a position, an orientation, or both a pose and an orientation. In some embodiments, the EM tracking system controls the power mode by adjusting a transmit power of the EM transmitter based on a metric correlated with jitter in the EM readings. Such a metric is referred to herein as a jitter metric and includes metrics such as estimated noise computed from received EM data, a computed distance between the transmitter and the receiver, a measured signal power between the transmitter and the receiver, and the like. By adjusting the transmit power based on the jitter metric, the EM tracking system can reduce overall power consumption at a device that employs the EM tracking system, thus allowing the system to be used in a wider variety of devices and improving the user experience with those devices.

To illustrate via an example, an EM tracking system can be employed in a virtual reality system including a head mounted display (HMD) and a hand-held controller. The HMD forms the base unit of the EM tracking system and includes the transmit module (Tx module) for the system, while the hand-held controller forms the mobile unit of the system and includes the corresponding receive module (Rx module). Because the EM tracking system depends on near-field magnetic coupling, the EM signal strength of the EM field generated by the Tx module falls off with distance at the rate of $1/r^3$ where r=distance between the Tx and Rx coils. Thus, as the hand-held controller moves farther from the HMD the signal-to-noise ratio (SNR) of the EM data falls sharply, resulting in rapidly increasing jitter (or "noise") that can negatively impact the user experience. Conventionally, the jitter is ameliorated by setting the transmit power for the Tx module to ensure desired performance at a specified maximum distance between the transmit coil at the HMD and the receive coil at the hand-held controller (for purposes of this example, it is assumed that the distance between the HMD and the hand-held controller can be derived from or is substantially the same as the distance between the transmit coil and the receive coil). However, in many cases the hand-held controller is much closer to the HMD than the maximum distance, such that the transmit power is greater than necessary for a satisfactory user experience, and thus wasting power. Using the techniques herein, the transmit power is adjusted based on a jitter metric, reducing the power consumption of the EM tracking system while maintaining jitter within a specified range to support a satisfactory user experience.

For example, when the jitter metric indicates relatively low jitter, the transmit power of the Tx module is set to a relatively low level. In response to the jitter metric increasing above a first threshold, the transmit power is increased to maintain the jitter within the specified range. As the jitter falls below a second threshold, the transmit power is decreased, reducing power consumption while maintaining the jitter within the specified range.

In some embodiments, the EM tracking system further conserves power by placing one or more modules of the system into a reduced power mode (referred to herein as a sleep mode) in response to one or more sleep conditions. Examples of such sleep conditions include a measured or computed distance between the base unit and the mobile unit of the tracking system, a status of communication between two devices, the requirements of an application for EM data, a user requesting the sleep mode, the sleep status of another device, and the like. By placing the system modules in the sleep mode, the EM tracking system can conserve power when, for example, it is unlikely that EM will be useful, such as when the distance between the base unit and the mobile unit is too great to generate EM poses at an acceptable level of quality. This in turn allows the EM tracking system to be used in a wide variety of devices and systems, such as those that employ battery power.

Turning to the Figures, FIG. 1 illustrates an EM tracking system 100 that adjusts a power mode of the system based on one or more of a metric correlated with jitter and a sleep condition in accordance with some embodiments. As used herein, adjusting a power mode of the system includes one or more of adjusting a transmit power used to generate an EM field, and placing one or more modules of the system into a sleep mode. In addition, as used herein, a sleep mode refers to a reduced power or low-power mode (including a mode where no power is provided) of a module or device, wherein the module or device consumes less power than in an active or full-power mode of the system.

In the depicted example, the EM tracking system 100 includes a base unit 102 and a mobile device 104. As described further herein, the EM tracking system 100 is generally configured to identify relative poses between the base unit 102 and the mobile device 104 by generating an EM field 130, measuring a magnitude and/or phase of the generated EM field 130 (referred to herein generally as "EM data"), and computing a relative pose based on the corresponding EM data. The EM tracking system 100 can therefore be incorporated into a variety of devices and systems that employ pose identification features. For example, in some embodiments the EM tracking system 100 is incorporated in a virtual reality (VR) to identify a relative pose between an HMD and a hand-held controller. Thus, in some configurations, the base unit is the HMD and the mobile unit is the hand-held controller. In other configurations, the base unit is a device separate from the HMD (such as an accessory or a base-station).

In the illustrated embodiment, the EM field 130 is generated by the base unit 102 and the EM data is read at the mobile device 104. It will be appreciated that other configurations are possible, including the EM field 130 being generated by the mobile device 104 and the EM data being read at the base unit 102 (an example of this configuration is illustrated and described below at FIG. 3). To support generation of the EM field, the base unit 102 includes a Tx module 103, whereby the Tx module 103 includes a transmitter coil 110 and an amplifier 112. In some embodiments, the transmitter coil 110 is a tri-axis coil generally configured to generate the EM field 130 at a strength, referred to herein as the transmit power, wherein the transmit power is based on electrical power provided by the amplifier 112 to the transmitter coil 110. The amplifier 112 is a programmable amplifier generally configured to generate the electrical power at a magnitude based on received control signaling as described further below. Thus, the transmit power for the EM field 130 is a programmable value that is controlled at the base unit 102 as described further below.

To support reading of EM data, the mobile device 104 includes an Rx module 105 having a receiver coil 120 and an analog-to-digital converter (ADC) 122. In some embodiments, the receiver coil 120 is a tri-axis coil configured to generate an analog electrical signal having a magnitude and/or phase indicative of a detected EM field 130. The ADC 122 is generally configured to receive the generated analog signal and convert the analog signal to a digital value indicative of the analog signal, and therefore indicative of the detected EM field 130. Thus, in the example of FIG. 1, the digital values generated by the ADC 122 are EM data that can be used for pose identification as described further below.

To support pose identification (that is, identification of relative poses between the base unit 102 and the mobile device 104) the base unit 102 and the mobile device 104 include processors 115 and 125, respectively. The processors 115 and 125 are general-purpose or application-specific processors generally configured to execute instructions (e.g., computer programs) in order to carry out specified tasks. In some embodiments, at least one of the processors 115 and 125 executes instructions to identify a relative pose between the base unit 102 and the mobile device 104 based on the EM data provided by the ADC 122.

In addition, in the example of FIG. 1 the processors 115 and 125 are connected via a communication link 135 to support communication of EM data, identified poses, or other information. For example, in some embodiments the processor 125 identifies poses based on the EM data and communicates the identified poses to the processor 115. In other embodiments, the processor 125 communicates the EM data to the processor 115, which identifies poses based on the EM data. The communication link 135 can be a wired communication link, a wireless communication link (e.g. Bluetooth), and the like, or a combination thereof. In other embodiments, the EM data can be sent to a third processor (not pictured) where the pose is computed from the EM data.

In some embodiments, one or more of the processors 115 and 125 (or a third processor not shown at FIG. 1) execute additional sets of instructions to use the poses determined based on the EM data. For example, in some embodiments wherein the base unit 102 is an HMD, and the mobile device 104 is a hand-held controller, the processor 115 can execute sets of instructions to display a virtual reality environment to a user and employ the identified poses to determine a location of the hand-held controller in the virtual reality environment, thereby allowing the user to interact with the virtual reality environment using the hand-held controller.

In the illustrated embodiment of FIG. 1, the mobile device 104 includes a secondary pose sensor 116 to provide secondary pose information (or information that can be used to generate a pose) to the processor 125. It will be appreciated that in other embodiments, the secondary pose sensor can be located at the base unit 102, and in still other embodiments both the base unit 102 and the mobile device 104 include a secondary pose sensor. The secondary pose sensor 116 can be an inertial measurement unit (IMU), a simultaneous localization and mapping (SLAM) module, a magnetometer, or other pose sensor, or any combination thereof. One or more of the processors 115 or 125 or a 3rd processor can use the secondary pose information to supplement or augment the poses identified based on the EM data. For example, in some embodiments the processor 125 can use the secondary pose information to identify potential errors in the poses determined based on the EM data, and to address the identified errors.

Returning to the TX module 103, as noted above the amplifier 112 and transmitter coil 110 generate the EM field 130, wherein the transmit power and the power consumed by the TX module 103 is based on control signaling. In some embodiments, the control signaling is generated by the processor 115 based at least in part on one or more jitter metrics. The processor 115 can thus control the transmit power and power consumption of the TX module 103 based on the one or more jitter metrics, thereby conserving overall power consumption of the EM tracking system 100.

To illustrate via an example, in some embodiments the processor 115 estimates a distance between the mobile device 104 and the base unit 102. The distance can be estimated based on the poses generated from the EM data, from the secondary pose information provided by the secondary pose sensor 116, or a combination thereof. The computed distance is correlated with jitter in the EM data generated by the RX module 105, such that the jitter in the EM data increases as the distance between the base unit 102 and the mobile device 104 increases. Accordingly, in response to identifying that the computed distance between the base unit 102 and the mobile device 104 has exceeded a specified maximum threshold, the processor 115 sends control signaling to the amplifier 112 to increase the transmit power to the transmitter coil 110, thereby reducing jitter in the EM data. In response to identifying that the computed distance between the base unit 102 and the mobile device 104 has fallen below a specified minimum threshold, indicating that jitter in the EM data should be less than a specified level, the processor 115 sends control signaling to the amplifier 112 to reduce the transmit power to the transmitter coil 110, thereby conserving power consumed by the TX module 103. The processor 115 thus maintains jitter in the EM data within a specified range to provide a satisfactory user experience while conserving the amount of power consumed by the EM tracking system 100.

It will be appreciated that the processor 115 can employ other jitter metrics instead of or in addition to computed distance to set the transmit power to the transmitter coil 110. Examples of such jitter metrics include estimated noise computed from the EM data received at the Rx module 105, a measured signal power of the EM field 130, and the like. Further, in some embodiments the EM tracking system 100 employs more than one jitter metric in combination.

It will be appreciated that in other embodiments one or more or the power management operations described herein can be performed at the base unit 102, at the mobile device 104, or via the base unit 102 and the mobile device 104 sharing information via the communication link 135. For example, in some embodiments, the need for a change in transmit power can be identified by the mobile device 104, which selects the new transmit power level and communicates the selected transmit power level to the base unit 102. In response, the base unit 102 sets the transmit power to the selected power level. In other embodiments, the mobile device 104 informs the base unit 102 that a power change is desired. In response, the base unit 102 selects the new transmit power and informs the mobile device 104 of the new transmit power via the communication link 135.

In addition to conserving power by controlling the transmit power to the transmitter coil 110, the processor 115 can conserve power by placing the Tx module 103 in a sleep mode based on one or more specified sleep conditions. In some embodiments, the processor 115 places the Tx module 103 into the sleep mode in response to detecting one or more sleep conditions indicating that the EM poses generated by the EM tracking system 100 are not likely to be useful. Thus, for example, the processor 115 can place the Tx module 103 in the sleep mode in response to a distance between the base unit 102 and the mobile device 104 (as indicated by the poses identified from the EM data) exceeding a maximum distance threshold, whereby the maximum distance threshold corresponds to a distance wherein jitter in the EM data is above acceptable limits. Other examples of sleep conditions can include a user request for the sleep mode, a detected break or lapse in the communication link 135, an indication from software executing at the processor 115 that pose information is not required by an executing application, detecting a lack of motion in the mobile device 104, a monitored device (such as a computer that controls the base unit 102) entering its own sleep mode, and the like. The processor 115 is thus able to conserve power consumption by the base unit 102, allowing the EM tracking system 100 to be employed in a variety of electronic devices and systems, such as those operating on battery power. In addition, it will be appreciated that, in some embodiments, the mobile device 104 can also be placed in a sleep mode based on one or more of the sleep conditions described above, thereby further conserving power consumption by the EM tracking system 100.

In some embodiments, while the Tx module 103 is in sleep mode, the Tx module 103 is powered at a low level for detecting exit conditions from the sleep state. In other embodiments, the Tx module 103 is turned off in the sleep mode and is periodically turned on to determine if it should exit the sleep state. In other embodiments, the secondary sensor (such as an IMU) is used to determine whether the Tx module should exit sleep mode. In yet other embodiments, the Tx module remains in sleep mode until a user-initiated action is taken, such as the user pressing a button or shaking the mobile device 104.

Figure 2:
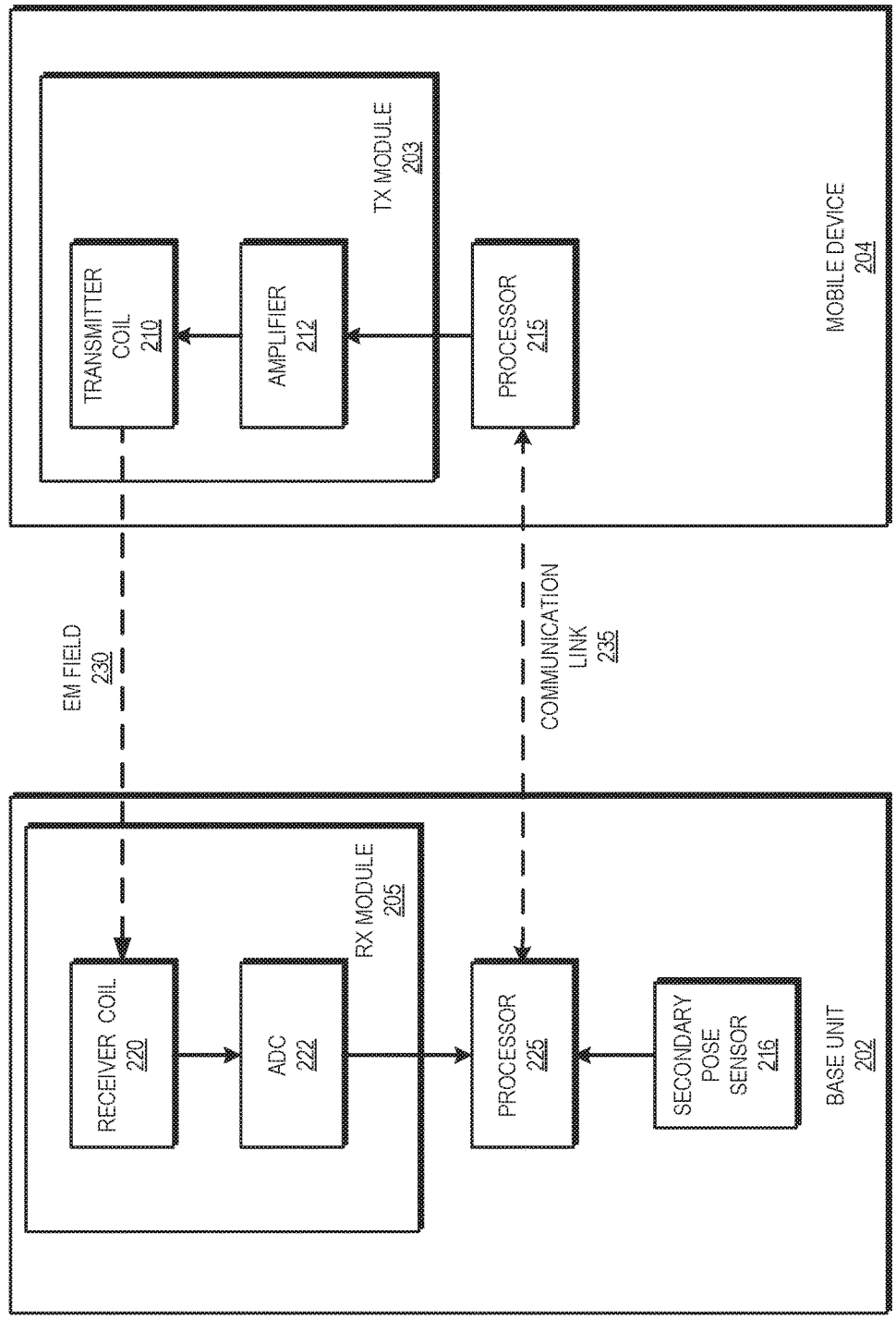
FIG. 2 is a block diagram of another EM tracking system that adjusts a power mode of the system based on one or more of a metric correlated with jitter and a sleep condition in accordance with some embodiments.

As noted above, the power management techniques described herein can be implemented at EM tracking systems having any of several configurations. Another such configuration is illustrated at FIG. 2 in accordance with some embodiments. In particular, FIG. 2 illustrates an EM tracking system 200 having a base unit 202 and a mobile device 204. The EM tracking system 200 is similar to the EM tracking system 100 of FIG. 1, but the EM tracking system 200 places the Rx module at the base unit 202 and the Tx module at the mobile device 204.

In particular, in the example of FIG. 2 the base unit 202 includes an Rx module 205, having a receiver coil 220 and an ADC 222, and further includes a processor 225 and a secondary pose sensor 216. The mobile device 204 includes a Tx module 203 having a transmitter coil 210 and an amplifier 212, and further includes a processor 215. The above-referenced modules are configured to operate similarly to the corresponding modules of FIG. 1 as described above. Thus, the Tx module 203 is generally configured to generate an EM field 230, and the Rx module 205 is generally configured to generate EM data from the sensed EM field 230. The processors 225 and 215 communicate via a communication link 235 to identify, based on the EM data, relative poses between the base unit 202 and the mobile device 204. The identified poses can be augmented or supplemented by secondary pose information generated by the secondary pose sensor 216.

In addition, the EM tracking system 200 implements one or more of the power management techniques described herein. For example, in some embodiments the processor 215 adjusts a transmit power for the EM field 230 (and therefore a power consumption of the mobile device 204) based on one or more jitter metrics such as a computed distance between the base unit 202 and the mobile device 204, or any of the other jitter metrics described herein. Further, in some embodiments the processor 215 places the TX module 203 in a sleep mode in response to detecting one or more sleep conditions, such as the computed distance between the base unit 202 and the mobile device 204 exceeding a threshold, or any of the other sleep conditions described herein.

Figure 3:
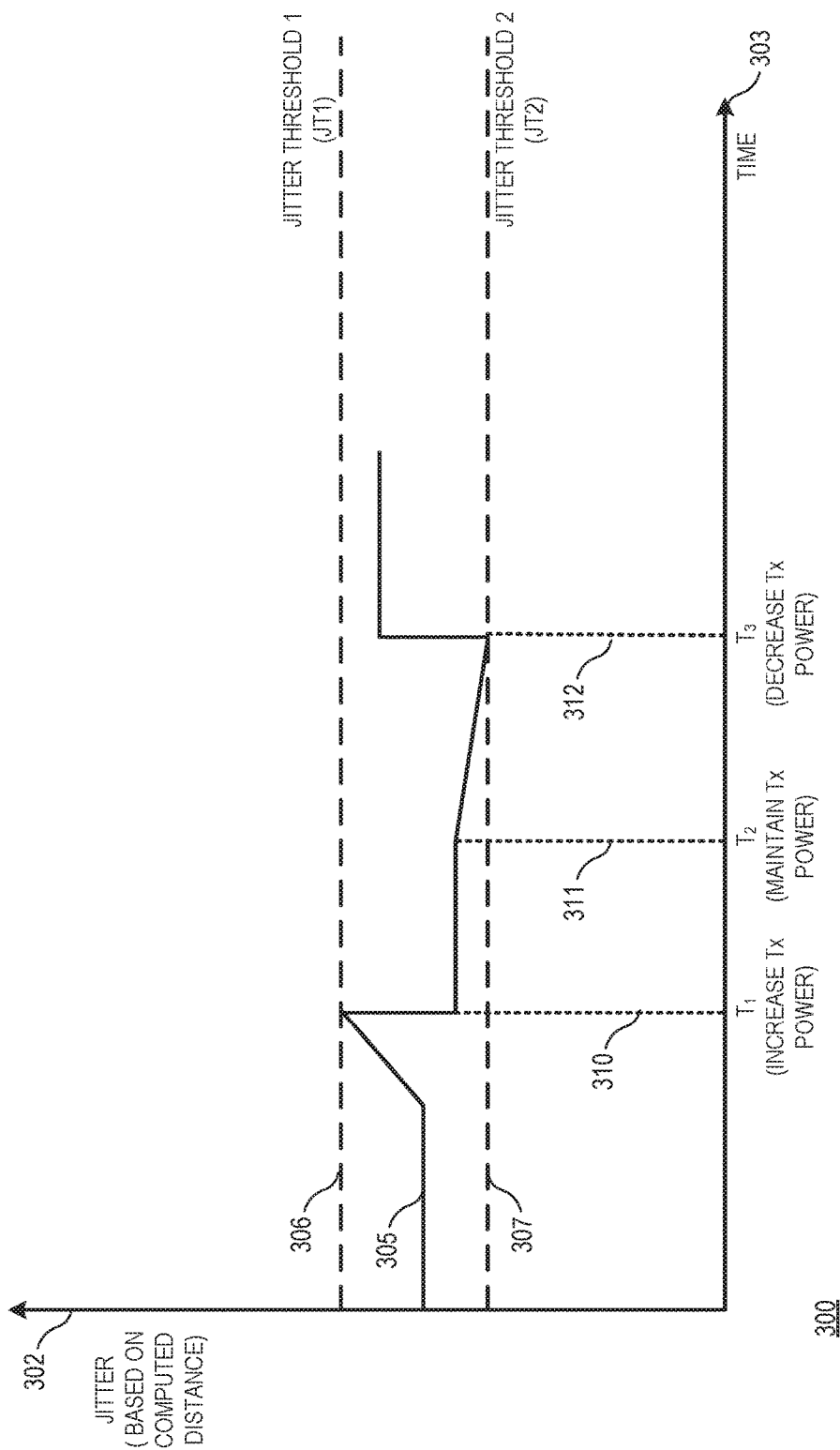
FIG. 3 is a diagram illustrating an example of an EM tracking systems adjusting a power mode of the system based on a metric correlated with jitter in accordance with some embodiments.

FIG. 3 is a diagram 300 depicting an example of an EM tracking system changing a power mode of the system, and the delivered power to the transmitter coil, based on a jitter metric in accordance with some embodiments. For purposes of description, the diagram 300 is described with respect to an example implementation at the EM tracking system 100 of FIG. 1, but it will be appreciated that the techniques described herein can be implemented at EM tracking systems having a different configuration, such as the EM tracking system 200 of FIG. 2.

In the illustrated example, the diagram 300 includes an x-axis 303, representing time, and a y-axis 302, representing a jitter metric. The diagram 300 further illustrates a jitter curve 305, and thresholds 306 and 307. Thresholds 306 and 307 represent an upper level jitter threshold (designated JT1) and a lower level jitter threshold (designated JT2), respectively, at which the processor 115 of the base unit 102 adjusts the transmit power of the Tx module 103 as described further herein. In at least one embodiment, the threshold JT1 is set at a jitter level at which a user is expected to perceive the impact of the jitter. For example, the threshold JT1 can be set at a level wherein the corresponding jitter is deemed unacceptable to users.

Curve 305 represents the jitter in the EM data collected by the Rx module 105 over time. For the example of FIG. 3, it is assumed that the processor 115 identifies the jitter based on a jitter metric of computed distance between the base unit 102 and the mobile device 104. In particular, the jitter in the EM data has a known or predicted relationship with the computed distance and the measured power of the EM field 130. In some embodiments, this known or predicted relationship is identified based on testing of the EM tracking system 100 in a test environment.

In operation, the processor 115 can compute the distance between the base unit 102 and the mobile device 104 based on poses generated from the EM data, from secondary pose data derived from the secondary pose sensor, or a combination thereof. Based on the computed distance and the transmit power for the EM field 130, the processor 115 infers the jitter in the EM data, as indicated by curve 305. In the illustrated example, the curve 305 initially lies between the upper and lower jitter thresholds, and the processor 115 therefore sets the transmit power for the EM field 130 to a nominal level, designated for purposes of description as power level P1. At time 310 the distance between the base unit 102 and the mobile device 104 has increased to the point that the jitter has reached the threshold JT1. In response, the processor 115 sends control signaling to the amplifier 112 to increase the transmit power to the EM transmitter coil 110 to a higher level, designated power level P2, where the power level P2 is greater than the power level P1. As depicted in FIG. 3, because of the increase in the transmit power to the power level P2, the jitter in the EM data drops below the threshold JT1.

At time 311, the distance between the base unit 102 and the mobile device 104 is such that the jitter in the EM data is between the thresholds jT1 and JT2. Accordingly, the processor 115 maintains the transmit power to the EM transmitter coil 110 at the power level P2. At time 312, the distance between the base unit 102 and the mobile device 104 decreases such that the jitter in the EM data reaches the lower threshold JT2, indicating that the jitter is below a level at which it is likely to affect a user experience. Accordingly, in response to the jitter reaching the lower threshold PT2, the processor 115 sends control signaling to the amplifier 112 to reduce the transmit power to the transmitter coil 110 to the power level P1. Thus, in the example of FIG. 3, the processor 115 maintains the jitter in the EM data to within a nominal range represented by the thresholds JT1 and JT2 by adjusting the transmit power to the transmitter coil 110 based on the computed distance between the base unit 102 and the mobile device 104. It will be appreciated that in other embodiments the processor 115 can maintain the jitter in a similar manner based on other jitter metrics, such as estimated noise computed from the received EM data and a measured signal power between the transmit module 103 and the Rx module 105.

It will be appreciated that in some scenarios the reliability of poses calculated based on the received EM data is disrupted by changes to the transmit power of the transmitter coil 110. Accordingly, in some embodiments, the processor 125 can discard one or more data samples generated from the EM data in response to the jitter reaching one of the thresholds JT1 and JT2. For example, in some embodiments, the processor 125 discards all pose samples for a specified amount of time after a change in the transmit power to the transmitter coil 110. In other embodiments, the processor 125 identifies a "window" of time based on, for example the communication latency between the base unit 102 and the mobile device 104 and discards all pose samples that fall within the window. For example, if it is known that the communications link latency is 10 ms, the processor 115 can discard samples between 10 ms and 25 ms from the time the transmit power was changed. In still other embodiments, in response to changing the transmit power, the processor 125 inspects EM data samples or pose samples for errors and discards the samples until the inspection indicates a threshold number of samples without errors. The processor 125 thus ensures that changes in the transmit power to the transmitter coil 110 does not negatively impact the user experience. In some embodiments, the data is sent to a third processor other than the processor 115 or the processor 125, and the third processor discards data samples as described above.

Figure 4:
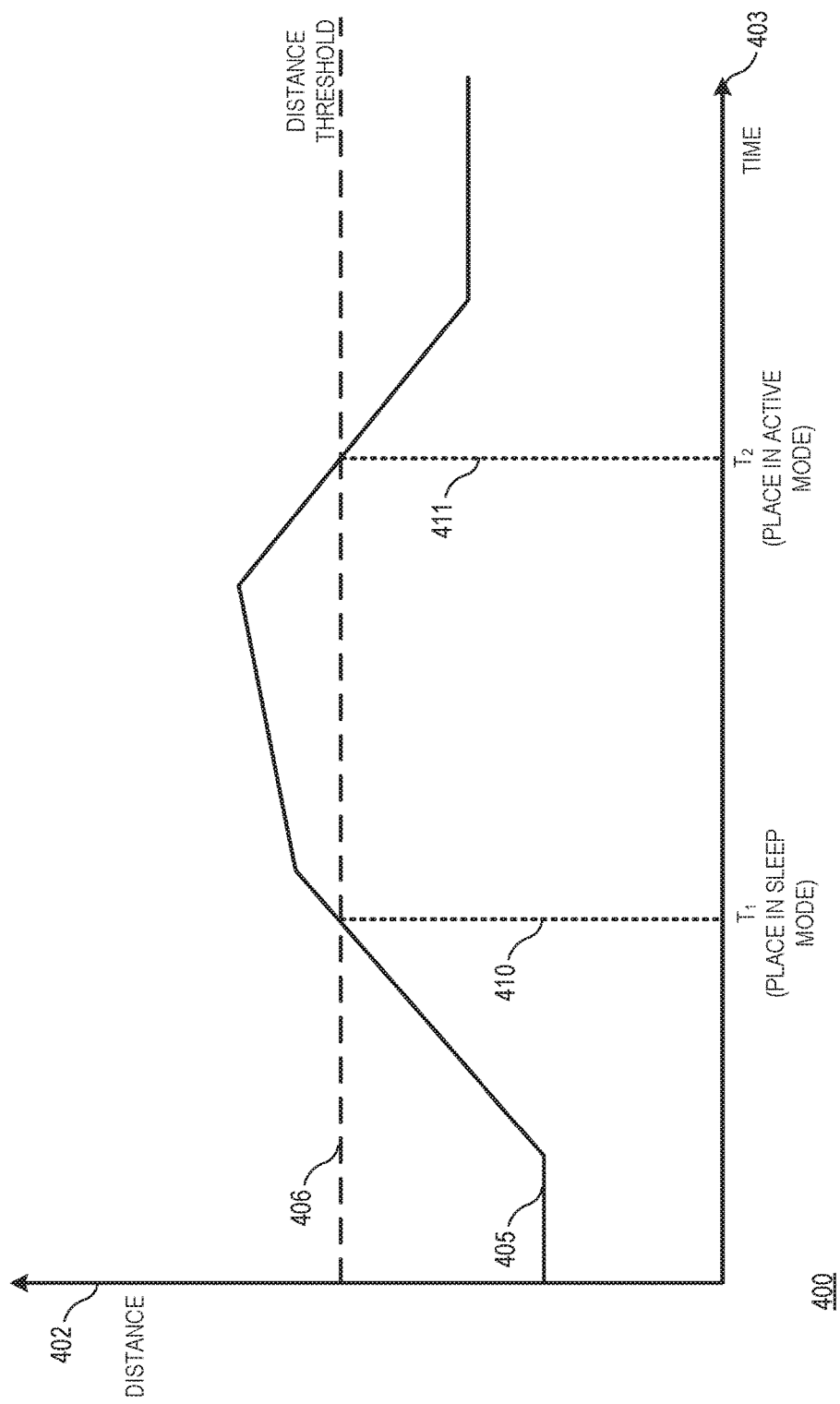
FIG. 4 is a diagram illustrating an example of an EM tracking system adjusting a power mode of the system based on a distance sleep condition in accordance with some embodiments.

FIG. 4 is a diagram 400 depicting an example of an EM tracking system changing a power mode of the system, and in particular placing a Tx module of an EM tracking system in a sleep mode, based on a distance between the base unit and a mobile device in accordance with some embodiments. For purposes of this description, the diagram 400 is described with respect to an example implementation at the EM tracking system 100 of FIG. 1, but it will be appreciated that the techniques described herein can be implemented at EM tracking systems having a different configuration, such as the EM tracking system 200 of FIG. 2. In addition, it will be appreciated that other aspects of an EM tracking system can be placed in a sleep mode according to a similar technique as described below with respect to FIG. 4, including the mobile device or other device, an individual module, or group of modules, of the base unit or the mobile device, or any combination thereof.

In the illustrated example, the diagram 400 includes an x-axis 403, representing time, and a y-axis 402, representing distance between the base unit 102 and the mobile device 104. The diagram 400 further illustrates a curve 405 and a threshold 406. Threshold 406 represents a distance threshold at which the processor 115 places the base unit 102 in the sleep mode. In at least one embodiment, the distance threshold is set to correspond to the maximum operating range of the EM tracking system. The maximum operating range can be set, in one embodiment, to the expected maximum distance a user would be able to hold a VR controller from a VR headset. In another embodiment, the maximum range is a distance at which the jitter in the EM data received at the mobile device 104 is unacceptable even at the maximum desired operating power of the Tx module (e.g. a point at which the jitter in the pose is expected to negatively impact the user experience) between the base unit 102 and the mobile device 104.

Curve 405 represents the distance between the base unit 102 and the mobile device 104 over time. In operation, the processor 115 can compute the distance between the base unit 102 and the mobile device 104 based on poses generated from the EM data, from secondary pose data generated by the secondary pose sensor, or a combination thereof. In the illustrated example, the curve 405 initially lies below the threshold distance, such that jitter in the EM data is at an acceptable level, and the processor 115 therefore maintains the base unit 102 in an active (non-sleep) mode. At time 410 the distance between the base unit 102 and the mobile device 104 has increased to cross the distance threshold. In response, the processor 115 sends control signaling to place the Tx module 103 in the sleep mode. In some embodiments, the processor 115 waits for the distance threshold to be exceeded for a specified amount of time (or, in some embodiments, for a specified number of samples of EM data) before placing the base unit in the sleep mode, thereby ensuring that relatively brief excursions beyond the distance threshold do not trigger entry into the sleep mode.

At time 411, the processor 115 identifies that the distance between the base unit 102 and the mobile device 104 has fallen below the distance threshold. In some embodiments, while the TX module 103 is in the sleep mode, the base unit 102 has sufficient power for the processor 115 to continue to identify the relative pose of the base unit 102 and the mobile device 104, but at a reduced rate relative to the active mode. In other embodiments, the base unit 102 periodically returns the TX module 103 to the active mode to determine the relative pose of the base unit 102 and the mobile device 104 and returns the TX module 103 to the sleep mode if the distance between the base unit 102 and the mobile device 104 remains above the distance threshold. In still other embodiments, the processor 115 employs data provided by the secondary pose sensor 116 to identify the distance between the base unit 102 and the mobile device 104 while in the sleep mode. The processor 115 is therefore able to identify when the distance between the base unit 102 and the mobile device 104 has fallen below the distance threshold, as at time 411. In response to the distance between the base unit 102 and the mobile device 104 falling below the distance threshold at time 411, the processor 115 sends control signaling to return the Tx module 103 to the active mode. In some embodiments, the processor 115 does not return the Tx module 103 to the active mode until the distance he base unit 102 and the mobile device 104 is below the distance threshold for a threshold amount of time or threshold number of data samples. The EM tracking system 100 thus conserves power by maintaining the Tx module 103 in the sleep mode when the distance between the base unit 102 and the mobile device 104 is beyond the configured operating range of the EM tracking system.

Figure 5:
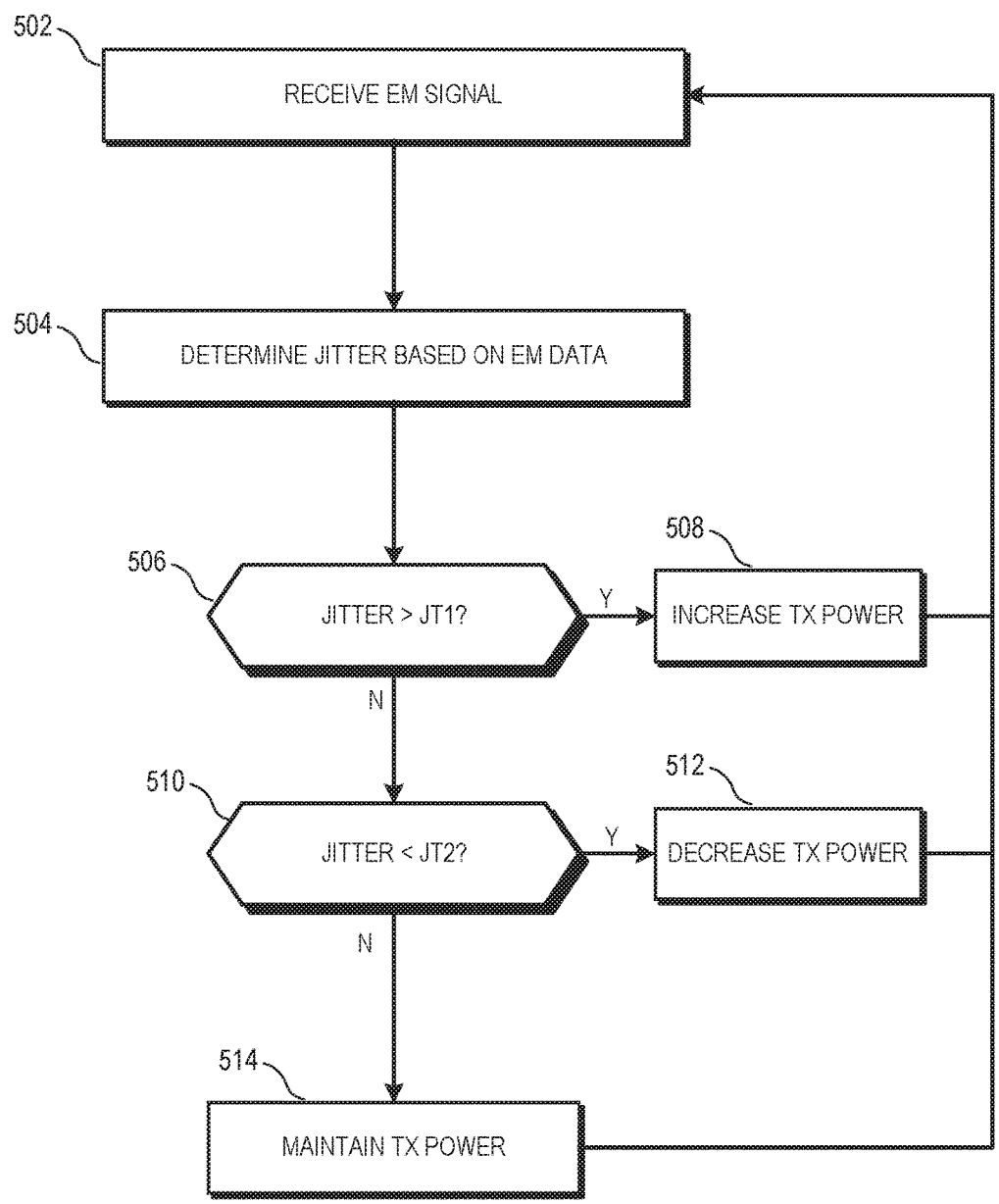
FIG. 5 is a flow diagram of a method of an EM tracking system adjusting a power mode of the system based on a metric correlated with jitter in accordance with some embodiments.

FIG. 5 is a flow diagram of a method 500 of an EM tracking system adjusting a power mode of the system based on a metric correlated with jitter in accordance with some embodiments. The method 500 is described with respect to an example implementation at the EM tracking system 100 of FIG. 1, but it will be appreciated that the method can be implemented at EM tracking systems having other configurations. In addition, it will be appreciated that other aspects of an EM tracking system can be placed in a sleep mode according to a similar technique as described below with respect to FIG. 5, including the mobile device or other device, an individual module, or group of modules, of the base unit or the mobile device, or any combination thereof.

At block 502, the processor 125 receives EM data from the Rx module 105. For purposes of description, it is assumed that the processor 125 provides the EM data to the processor 115 via the communication link 135 for pose identification, jitter metric calculation, and the like. At block 504, the processor 115 identifies one or more jitter metrics using received EM data, such as computed distance between the base unit 102 and the mobile device 104, estimated noise computed from the received EM data, a measured signal power between the transmitter and the receiver, and the like. At block 506, the processor 115 determines whether the identified jitter metric has reached or exceeded the upper threshold JT1. If so, the method flow moves to block 508 and the processor 115 increases the transmit power to the transmitter coil 110. The method flow returns to block 502 and the EM tracking system 100 continues to collect EM and secondary pose data.

Returning to block 506, if the processor 115 determines that the jitter is below the threshold JT1, the method flow proceeds to block 510 and the processor 115 determines whether the identified jitter has reached or fallen below the lower threshold JT2. If so, the method flow proceeds to block 512 and the processor 115 decreases the transmit power to the transmission coil 110. The method flow returns to block 502. If, at block 510, the jitter has not reached or fallen below the threshold JT2, the method flow moves to block 514 and the processor 115 maintains the transmit power to the transmission coil 110 at its current level.

Figure 6:
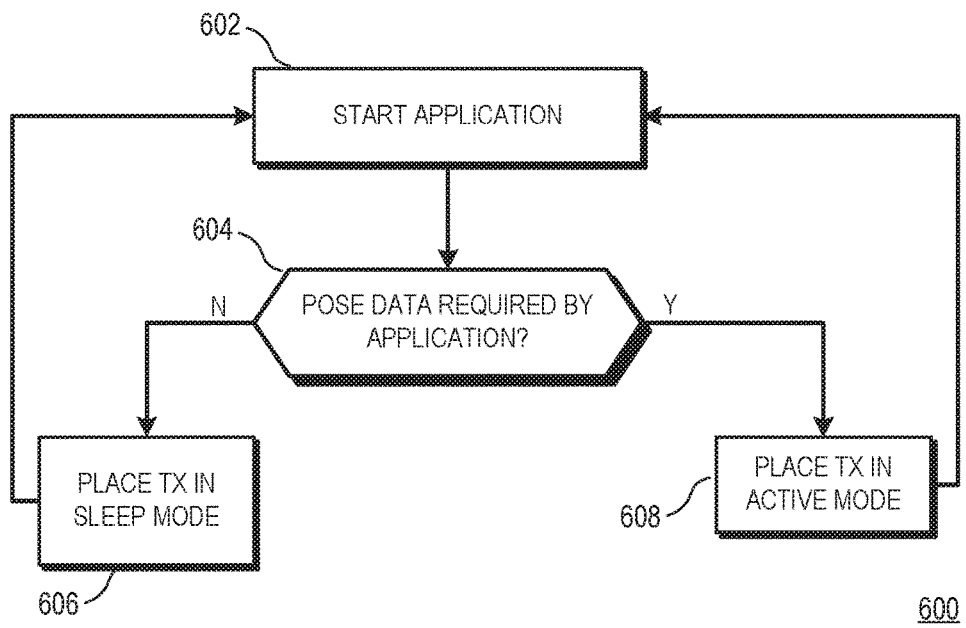
FIG. 6 is a flow diagram of a method of an EM tracking system adjusting a power mode of the system based on requirements of an application for pose data in accordance with some embodiments.

FIG. 6 is a flow diagram of a method 600 of an EM tracking system adjusting a power mode of the system based on the requirements of an application for pose data in accordance with some embodiments. The method 600 is described with respect to an example implementation at the EM tracking system 100 of FIG. 1, but it will be appreciated that the method can be implemented at EM tracking systems having other configurations. In addition, it will be appreciated that other aspects of an EM tracking system can be placed in a sleep mode according to a similar technique as described below with respect to FIG. 6, including the mobile device or other device, an individual module, or group of modules, of the base unit or the mobile device, or any combination thereof.

At block 602, an application begins execution at the processor 115. At block 604, the processor 115 determines whether the application requires pose information (that is, if the application will make use of pose computed by the EM tracking system. The processor 115 can make this determination based on one or more of a variety of criteria, such as an explicit request from the application, an identification of a type of the application (as indicated by the application itself or in a stored list of application types), and the like. If the application does not require the pose information from the EM tracking system, the method flow moves to block 606 and the processor 115 places the Tx module 103 in a sleep mode. The method flow returns to block 602 and the processor 115 awaits initiation of another application.

Returning to block 604, if the processor 115 determines that the application does require pose information provided by the EM tracking system, the method flow moves to block 608 and the processor 115 places the Tx module 103 in an active mode so that the EM tracking system 100 can collect EM data and identify poses. The method flow returns to block 602.

Figure 7:
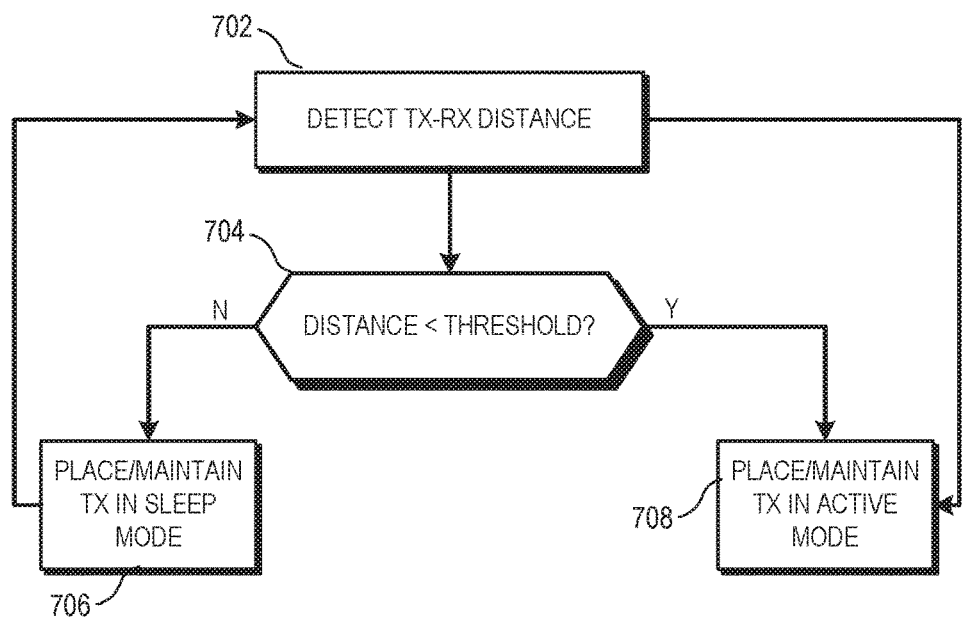
FIG. 7 is a flow diagram of a method of an EM tracking system adjusting a power mode of the system based on a sleep condition of distance in accordance with some embodiments.

FIG. 7 is a flow diagram of a method 700 of an EM tracking system adjusting a power mode of the system based on a sleep condition of distance in accordance with some embodiments. The method 700 is described with respect to an example implementation at the EM tracking system 100 of FIG. 1, but it will be appreciated that the method can be implemented at EM tracking systems having other configurations. In addition, it will be appreciated that other aspects of an EM tracking system can be placed in a sleep mode according to a similar technique as described below with respect to FIG. 7, including the mobile device or other device, an individual module, or group of modules, of the base unit or the mobile device, or any combination thereof.

At block 702, the processor 115 identifies a distance between the base unit 102 and the mobile device 104. In some embodiments, the processor 115 identifies a metric correlated with distance, such as a received signal level of the EM data. The processor 115 can identify the distance based on poses calculated from the EM data, poses calculated from the secondary pose data, or a combination thereof. At block 704, the processor 115 determines whether the distance is greater than a distance threshold, which could signify in some embodiments that the mobile device is out of range. If so, the method flow moves to block 706 and the processor 115 places (if in the active mode) or maintains (if in the sleep mode) the Tx module 103 in a sleep mode. The method flow returns to block 702 and the processor 115 continues to identify the distance between the base unit 102 and the mobile device 104.

Returning to block 704, if the processor 115 determines that the distance is below the distance threshold, the method flow moves to block 708 and the processor 115 places (if in the sleep mode) or maintains (if in the active mode) the Tx module 103 in an active mode so that the EM tracking system 100 can collect EM data and identify poses. The method flow returns to block 702.

Figure 8:
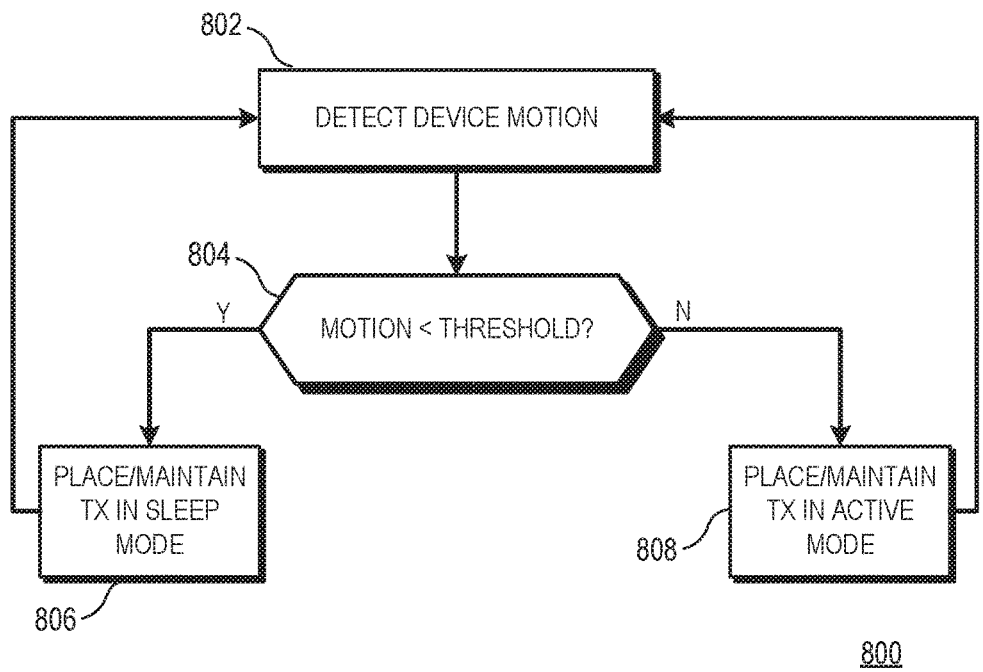
FIG. 8 is a flow diagram of a method of an EM tracking system adjusting a power mode of the system based on a sleep condition of detected motion.

FIG. 8 is a flow diagram of a method 800 of an EM tracking system adjusting a power mode of the system based on a sleep condition of detected motion. The method 800 is described with respect to an example implementation at the EM tracking system 100 of FIG. 1, but it will be appreciated that the method can be implemented at EM tracking systems having other configurations. In addition, it will be appreciated that other aspects of an EM tracking system can be placed in a sleep mode according to a similar technique as described below with respect to FIG. 8, including the mobile device or other device, an individual module, or group of modules, of the base unit or the mobile device, or any combination thereof.

At block 802, the processor 115 detects motion of a device, such as the mobile device 104, a device including the base unit 102 (e.g., an HMD), another device separate from the base unit 102 and the mobile device 104, and the like. The processor 115 can identify the motion based on poses calculated from the EM data, information provided by the secondary pose sensor 116, or a combination thereof. At block 804, the processor 115 determines whether the detected motion is less than a motion threshold. If so, the method flow moves to block 806 and the processor 115 places (if in the active mode) or maintains (if in the sleep mode) the Tx module 103 in a sleep mode. The method flow returns to block 802 and the processor 115 continues to identify the distance between the base unit 102 and the mobile device 104.

Returning to block 804, if the processor 115 determines that the detected motion is greater than a motion threshold, the method flow moves to block 808 and the processor 115 places (if in the sleep mode) or maintains (if in the active mode) the Tx module 103 in an active mode so that the EM tracking system 100 can collect EM data and identify poses. The method flow returns to block 802.

In one embodiment, the Tx module 103 is put into sleep mode if detected motion of the mobile device 104 being tracked falls below a threshold for a period of time. Thus, for example, if the measured velocity of the mobile device 104 stays below a velocity threshold for a timeout period, the Tx module 103 is put into sleep mode. The EM tracking system 100 can also employ derivatives and equivalents of velocity (such as acceleration, distance travelled, change of rotation, angular speed, and the like) to determine movement of the mobile device.

In some embodiments, the EM tracking system 100 uses motion detection data from other sources to determine when to enter the sleep mode and when to exit the sleep mode. For example, in some embodiments the EM tracking system 100 uses EM data to compute velocity for determining if the Tx module 103 is to enter sleep mode. Once in sleep mode, the EM tracking system 100 can use data from the secondary pose sensor 116 to determine if the velocity of the mobile device 104 has increased beyond the threshold and the Tx module 103 should exit sleep mode.

Figure 9:
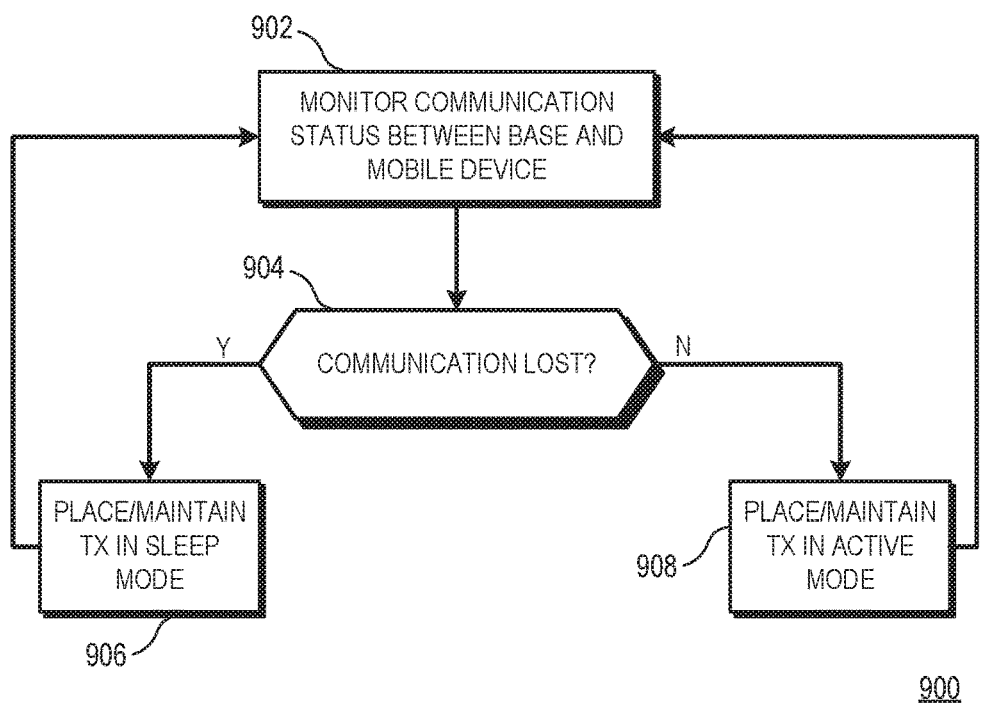
FIG. 9 is a flow diagram of a method of an EM tracking system adjusting a power mode of the system based on a sleep condition of a communication status between a base unit and mobile device in accordance with some embodiments.

FIG. 9 is a flow diagram of a method 900 of an EM tracking system adjusting a power mode of the system based on a sleep condition of a communication status between a base unit and mobile device in accordance with some embodiments. The method 900 is described with respect to an example implementation at the EM tracking system 100 of FIG. 1, but it will be appreciated that the method can be implemented at EM tracking systems having other configurations. In addition, it will be appreciated that other aspects of an EM tracking system can be placed in a sleep mode according to a similar technique as described below with respect to FIG. 5, including the mobile device or other device, an individual module, or group of modules, of the base unit or the mobile device, or any combination thereof.

At block 902, the processor 115 monitors a status of a communication link between the mobile device 104 and another device, such as the base unit 102, an external computer, or an accessory device. For purposes of description the method 900 is described with respect to monitoring the status of the communication link 135 between the base unit 102 and the mobile device 104. At block 904, the processor 115 determines whether communication has been lost (i.e. whether the communication link 135 has been broken such that the base unit 102 and the mobile device 104 cannot reliably communicate data). If so, the method flow moves to block 906 and the processor 115 places (if in the active mode) or maintains (if in the sleep mode) the Tx module 103 in a sleep mode. The method flow returns to block 902 and the processor 115 continues to monitor the status of the communication link 135.

Returning to block 904, if the processor 115 determines that the communication link 135 is in place and working properly, the method flow moves to block 908 and the processor 115 places (if in the sleep mode) or maintains (if in the active mode) the Tx module 103 in an active mode so that the EM tracking system 100 can collect EM data and identify poses. The method flow returns to block 902.

Figure 10:
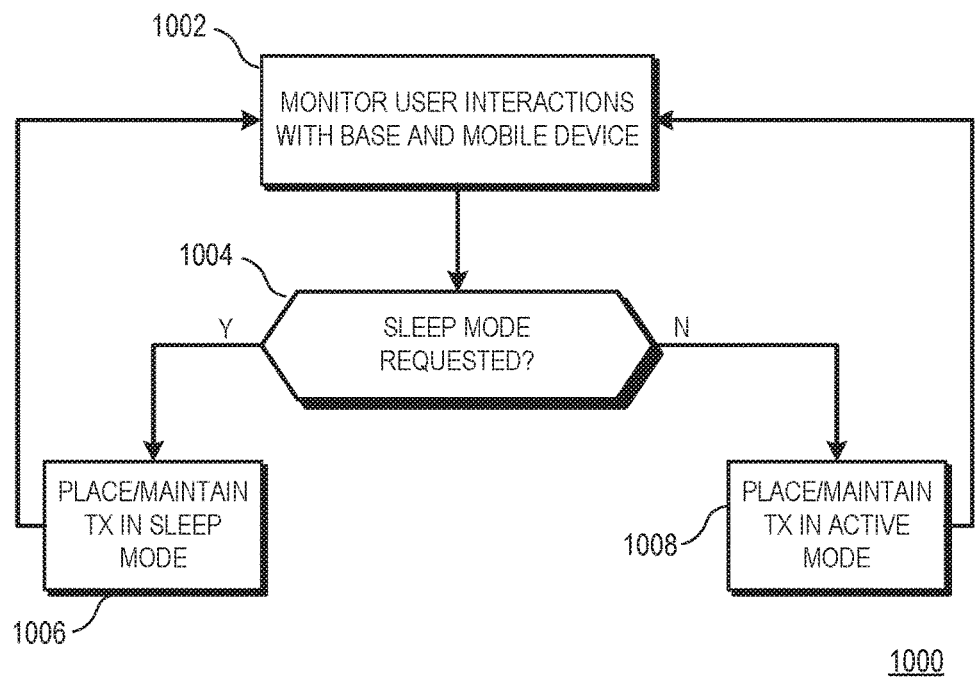
FIG. 10. is a flow diagram of a method of an EM tracking system adjusting a power mode of the system based on a sleep condition of a user requesting a sleep mode in accordance with some embodiments.

FIG. 10. is a flow diagram of a method 1000 of an EM tracking system adjusting a power mode of the system based on a sleep condition of a user requesting a sleep mode in accordance with some embodiments. The method 1000 is described with respect to an example implementation at the EM tracking system 100 of FIG. 1, but it will be appreciated that the method can be implemented at EM tracking systems having other configurations. In addition, it will be appreciated that other aspects of an EM tracking system can be placed in a sleep mode according to a similar technique as described below with respect to FIG. 10, including the mobile device or other device, an individual module, or group of modules, of the base unit or the mobile device, or any combination thereof.

At block 1002, the processor 115 monitors a user's interaction with a device, such as the mobile device 104 or another input/output device. At block 1004, the processor 115 determines whether the user has requested a sleep mode. If so, the method flow moves to block 1006 and the processor 115 places (if in the active mode) or maintains (if in the sleep mode) the Tx module 103. The method flow returns to block 1002 and the processor 115 continues to monitor the user's interaction with the device.

Returning to block 1004, if the processor 115 determines that the user has not requested the sleep mode, the method flow moves to block 1008 and the processor 115 places (if in the sleep mode) or maintains (if in the active mode) the Tx module 103 in an active mode so that the EM tracking system 100 can collect EM data and identify poses. The method flow returns to block 1002.

Figure 11:
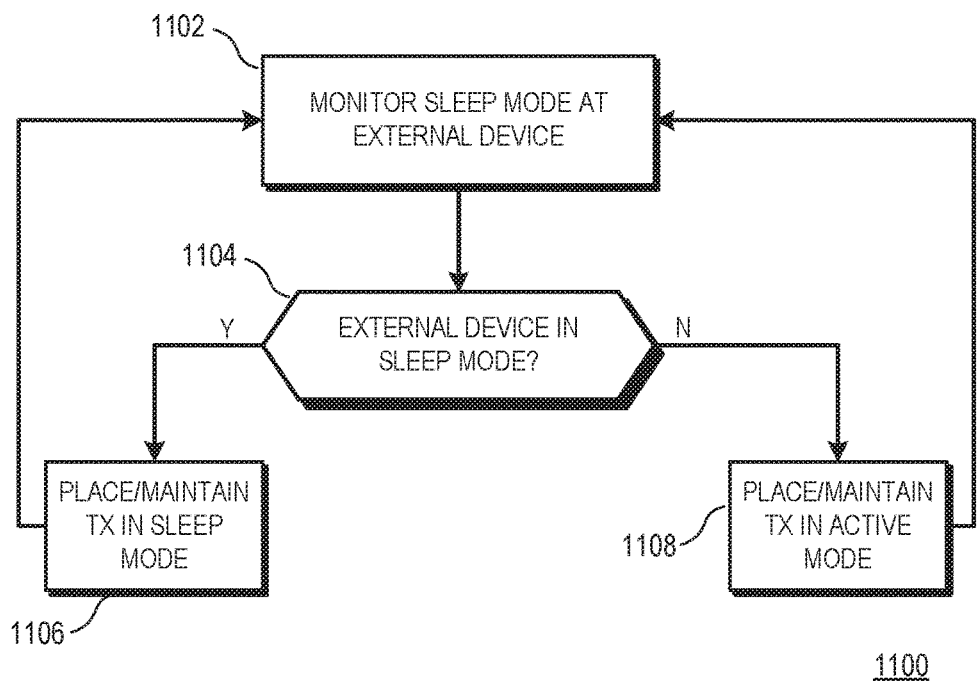
FIG. 11 is a flow diagram of a method of an EM tracking system adjusting a power mode of the system based on a sleep condition at a monitored device in accordance with some embodiments.

FIG. 11 is a flow diagram of a method 1100 of an EM tracking system adjusting a power mode of the system based on a sleep condition at a monitored device in accordance with some embodiments. The method 1100 is described with respect to an example implementation at the EM tracking system 100 of FIG. 1, but it will be appreciated that the method can be implemented at EM tracking systems having other configurations. In addition, it will be appreciated that other aspects of an EM tracking system can be placed in a sleep mode according to a similar technique as described below with respect to FIG. 11, including the mobile device or other device, an individual module, or group of modules, of the base unit or the mobile device, or any combination thereof.

At block 1102, the processor 115 monitors a status of a device. The base unit 102, the mobile device 104, an external computer providing a VR experience to a user, and accessories to any device are all examples of devices that can be monitored. At block 1104, the processor 115 determines whether the monitored device has been placed in a sleep mode (which might indicate that pose data generated by the EM tracking system 100 will not be used). If the monitored device is in sleep mode, the method flow moves to block 1106 and the processor 115 places (if in the active mode) or maintains (if in the sleep mode) the Tx module 103 in a sleep mode. The method flow returns to block 1102 and the processor 115 continues to monitor the status of the monitored device.

Returning to block 1104, if the processor 115 determines that the monitored device is in the active mode, the method flow moves to block 1108 and the processor 115 places (if in the sleep mode) or maintains (if in the active mode) the Tx module 103 in an active mode so that the EM tracking system 100 can collect EM data and identify poses. The method flow returns to block 1102.

It will be appreciated that although the methods of FIGS. 5-11 have been described with some operations being executed at the processor 115, in other embodiments of any of the methods, one or more of these operations can be performed by the processor 125, which shares the results with the processor 115 via the communication link 135. In still other embodiments, one or more of these operations can be shared between the processors 115 and 125 or performed by one more other processors.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
identifying, at an EM position tracking system, a first metric that is correlated to jitter in a relative pose between a transmitter and a receiver of the EM position tracking system;
setting a power mode of at least one of the transmitter and the receiver based on the first metric; and
in response to setting the power mode based on the first metric, discarding one or more samples generated from received EM data.

2. The method of claim 1, wherein the first metric is selected from the group consisting of: estimated noise computed from received EM data, a computed distance between the transmitter and the receiver, and a measured signal power between the transmitter and the receiver.

3. The method of claim 1, wherein setting the power mode comprises setting the power mode to a first mode in response to the first metric exceeding a first threshold.

4. The method of claim 3, wherein setting the power mode comprises setting the power mode to a second mode in response to the first metric falling below a second threshold different from the first threshold.

5. The method of claim 3, wherein the first threshold corresponds to a threshold at which a user is expected to perceive the jitter in the relative pose.

6. The method of claim 3, further comprising:
calculating the first threshold based on, at least in part, data received from the receiver.

7. The method of claim 1, wherein discarding the one or more samples comprises:
discarding the one or more samples based on inspection of the received EM data.

8. The method of claim 1, wherein discarding the one or more samples comprises:
identifying a time window relative to a time when a request to change the power mode is received; and
discarding samples for a threshold amount of time during the time window.

9. A method, comprising:
sensing, by an electromagnetic (EM) receiver of an EM tracking system, data from an EM transmitter of the EM tracking system transmitting at a first power level; and
in response to detecting a sleep condition, placing the EM transmitter in a sleep mode by lowering a transmission power level of the EM transmitter, wherein in response to placing the EM transmitter in a sleep mode, discarding one or more samples of data from the EM transmitter.

10. The method of claim 9, wherein detecting the sleep condition comprises detecting the sleep condition for one of a threshold amount of time and a threshold number of samples.

11. The method of claim 9 wherein the sleep mode corresponds to an off mode of the EM transmitter.

12. The method of claim 9, wherein detecting the sleep condition comprises detecting that an application executing at a computer system associated with the EM tracking system is executing an application that does not use poses generated by the EM tracking system.

13. The method of claim 9, wherein detecting the sleep condition comprises detecting a distance between the EM transmitter and the EM receiver is greater than a threshold.

14. The method of claim 9 wherein detecting the sleep condition comprises detecting the computed motion of a device is below a threshold.

15. The method of claim 14, wherein detecting the computed motion of the device comprises detecting the computed motion of the device based on a secondary sensor.

16. The method of claim 14, wherein detecting the computed motion of the device comprises detecting the computed motion of the device based on the data sensed by the EM receiver.

17. The method of claim 9, wherein detecting the sleep condition comprises detecting at least one of: receiving an indication that an associated device has entered a sleep mode, detecting a user selecting a mode that triggers the sleep mode, and detecting that a communications link between the EM transmitter and EM receiver has been interrupted.

18. A position tracking system comprising:
an electromagnetic (EM) receiver configured to generate a relative pose between an EM transmitter and the EM receiver; and,
one or more processors configured to:
identify a first metric that is correlated to jitter in the relative pose; and
set a power mode of at least one of the EM transmitter and the EM receiver based on the first metric, wherein in response to setting the power mode based on the first metric, one or more samples are discarded that are generated from received EM data.

19. The position tracking system of claim 18, wherein the first metric is selected from the group consisting of: estimated noise computed from received EM data, a measured distance between the transmitter and the receiver, and a measured signal power between the transmitter and the receiver.

20. The position tracking system of claim 18, wherein the one or more processors set the power mode comprises to a first mode in response to the first metric exceeding a first threshold.

21. The position tracking system of claim 20, wherein the one or more processors set the power mode to a second mode in response to the first metric exceeding a second threshold different from the first threshold.

22. The position tracking system of claim 20, wherein the first threshold corresponds to a threshold at which a user is expected to perceive the jitter in the relative pose.

23. The position tracking system of claim 20, wherein the one or more processors are configured to:
   calculate the first threshold based on at least in part, data received from the EM receivers.

24. The position tracking system of claim 18, wherein the one or more processors are configured to:
   in response to setting the power mode based on the first metric, discard one or more samples generated from received EM data.

25. The position tracking system of claim 18 wherein the one or more processors are configured to discard samples taken for a threshold amount of time after a request to change the power mode is received.

26. A position tracking system, comprising:
   an electromagnetic (EM) receiver configured to generate a relative pose between an EM transmitter and the EM receiver; and,
   one or more processors configured to:
   in response to detecting a sleep condition, placing the EM transmitter in a sleep mode by lowering a transmission power level of the EM transmitter, wherein in response to placing the EM transmitter in the sleep mode, discarding one or more samples of data from the EM transmitter.

27. The position tracking system of claim 26, wherein detecting the sleep condition comprises detecting the sleep condition for one of a threshold amount of time and a threshold number of samples.

28. The position tracking system of claim 26 wherein the sleep mode corresponds to an off mode of the EM transmitter.

29. The position tracking system of claim 26, wherein detecting the sleep condition comprises detecting that a computer system associated with the position tracking system is executing an application that does not use poses generated by the position tracking system.

30. The position tracking system of claim 26, wherein detecting the sleep condition comprises detecting a distance between the EM transmitter and the EM receiver has crossed a threshold.

31. The position tracking system of claim 26 wherein detecting the sleep condition comprises detecting the computed motion of a device is below a threshold.

32. The position tracking system of claim 31, wherein detecting the computed motion of the device comprises detecting the computed motion of the device based on a secondary sensor.

33. The position tracking system of claim 31, wherein detecting the computed motion of the device comprises detecting the computed motion of the device based on the data sensed by the EM receiver.

34. The position tracking system of claim 26, wherein detecting the sleep condition comprises detecting at least one of: receiving an indication that an associated device has entered a sleep mode, detecting a user selecting a mode that triggers the sleep mode, and detecting that a communications link between the EM transmitter and EM receiver has been interrupted.

\* \* \* \* \*